United States Patent [19]

Yip et al.

[11] Patent Number: 4,639,073

[45] Date of Patent: Jan. 27, 1987

[54] ELECTRO-OPTIC PULSE IMAGING RASTER OUTPUT SCANNER

[75] Inventors: Kwok-leung Yip; Mehdi N. Araghi, both of Webster; Joseph J. Daniele, Pittsford; Martin E. Banton, Fairport; Charles J. Kramer, Pittsford; Joachim A. Ritter, Webster, all of N.Y.

[73] Assignee: Xerox Corporation, Stamford, Conn.

[21] Appl. No.: 590,922

[22] Filed: Mar. 19, 1984

[51] Int. Cl.⁴ .................. G02B 26/10; H04N 1/04
[52] U.S. Cl. ..................................... 350/6.8; 358/296
[58] Field of Search ............ 350/355, 380, 381, 6.5, 350/6.8; 358/293, 296

[56] References Cited

U.S. PATENT DOCUMENTS

| | | | |
|---|---|---|---|
| 3,848,087 | 11/1974 | Carrell | 178/7.6 |
| 3,958,862 | 5/1976 | Seibor-Rylski | 350/160 R |
| 4,205,348 | 5/1980 | DeBenedictis et al. | 358/285 |
| 4,213,157 | 7/1980 | DeBenedictis et al. | 358/293 |
| 4,213,158 | 7/1980 | DeBenedictis et al. | 358/296 |
| 4,367,946 | 1/1983 | Varner | 355/71 |
| 4,370,029 | 1/1983 | Sprague | 350/355 |
| 4,396,246 | 8/1983 | Holman | 350/96.14 |
| 4,396,252 | 8/1983 | Turner | 350/355 |
| 4,487,472 | 12/1984 | Asano | 350/3.71 |

OTHER PUBLICATIONS

"Scophony Light Valve", R. V. Johnson, Applied Optics, vol. 18, No. 23, Dec. 1, 1979, p. 4030.

Primary Examiner—John K. Corbin
Assistant Examiner—Loha Ben
Attorney, Agent, or Firm—Frederick E. McMullen

[57] ABSTRACT

A raster output scanner having a recording member, a laser, a total internal reflection type modulator having an array of independently addressable electrodes, optical means cooperable with the laser to provide a sheetlike beam of high intensity radiation at the modulator, the array of electrodes being pulsed in succession with each image pixel to provide wave after wave of imaging or non-imaging beams, a scanning polygon for scanning the imaging beams from the modulator across the recording member line by line, and means for pulsing the modulator electrodes at a speed equal to the speed of the scanning polygon and in a direction opposite to the polygon scanning direction to obviate image blur.

8 Claims, 14 Drawing Figures

FIG. 7a  TIME = T

FIG. 7b  TIME = T+1

FIG. 7c  TIME = T+2

FIG. 7d  TIME = T+3

FIG. 8a  TIME = T

FIG. 8b  TIME = T+1

FIG. 8c  TIME = T+2

FIG. 8c'  TIME = T+3

FIG. 9

ELECTRO-OPTIC PULSE IMAGING RASTER OUTPUT SCANNER

The invention relates to raster output scanners, and more particularly to pulse imaging raster output scanners.

Raster output scanners employ a recording member such as a xerographic type photoreceptor on which images representative of the image signals being input to the scanner are produced, normally through exposure of the recording member line by line by a high intensity scanning beam. The image signals may originate from various sources such as memory, a communication channel, a raster input scanner, etc. Normally, the scanning beam is derived from a laser and suitable optical elements are provided to bring the laser beam to the desired shape and dimension and to focus the beam onto the mirrored surfaces of the scanning element, typically a polygon.

As will be understood by those skilled in the art, it is advantageous in raster output scanners to pulse image and thereby provide enhanced image clarity and reduce image blurring. However, pulsed imaging, which is a potentially powerful technology for high speed, high resolution raster output scanner design since it allows high contrast ratio and good optical efficiency to be achieved, requires that the velocity of the acoustic pulse in the modulator be exactly matched to the velocity of the spot on the recording member where the beam is focused. Usually a telescopic optical system is used to achieve this match, but the constraint of matched velocities and the very limited and fixed acoustic velocities available in conventional modulators severely constrains and penalizes the system design and makes pulse imaging difficult to utilize effectively. On the other hand, if it were possible to adjust the velocity in the acoustic modulator, virtually any combination of optical system and process speed could be accommodated. At the same time, since a design of this type is inherently less expensive and capable of higher performance that comparable acousto-optic modulators for pulse imaging applications, a cost saving/performance benefit can be achieved.

The invention provides a high performance pulse imaging system, comprising in combination: means providing a beam of high intensity radiation; a recording member on which images are formed; modulator means for modulating the beam in response to an image signal input to provide either an imaging or non-imaging beam; a movable scanning element for line scanning the imaging beam across the recording member to expose the recording member and form images thereon; the modulator including a substrate onto which the beam is impinged, and a row of discrete electrodes in operative relation with the substrate such that selective application of preset potentials to individual ones of the electrodes changes the index of refraction of the substrate in the vininity of the electrodes and causes the segment of the beam passing through the substrate vicinity to be diffracted into at least one other path, one of the diffracted or non-diffracted beams comprising the imaging beam; and control means for repeatedly applying the potentials in a predetermined manner to the electrodes in the row whereby the modulator outputs a succession of the beam segments across the width of the modulator for each imaging spot, the beam segments for each imaging spot cooperating to form the imaging beam, the control means applying the potentials to the row of electrodes in a direction opposite to the direction of movement of the scanning means to balance the rate at which successive ones of the beam segments are impinged on the recording member with the rate of movement of the scanning means whereby to obviate image blur.

Figure 1:
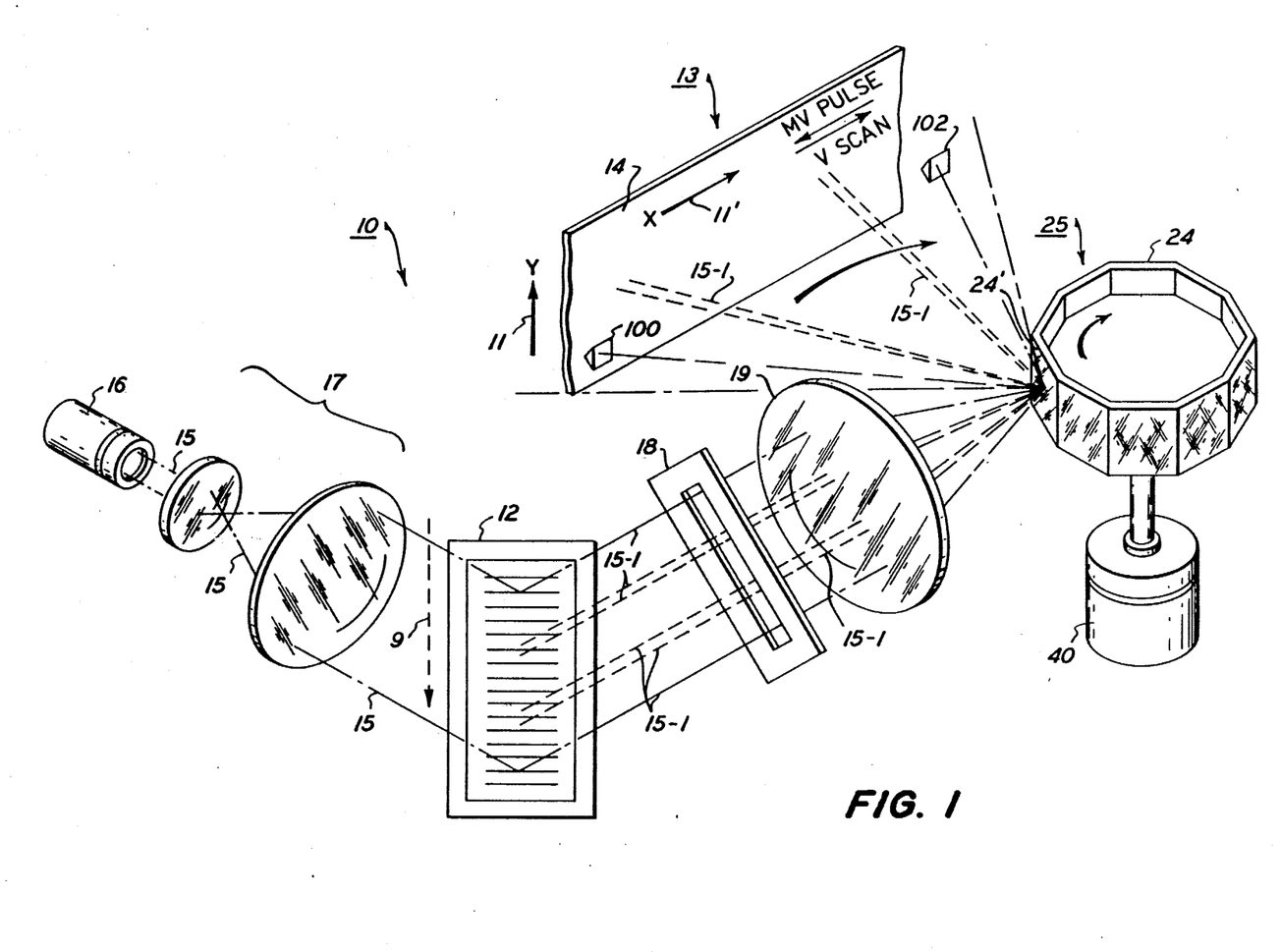
FIG. 1 is a schematic view of a raster output scanner incorporating the pulse imaging system of the present invention.
Figure 2:
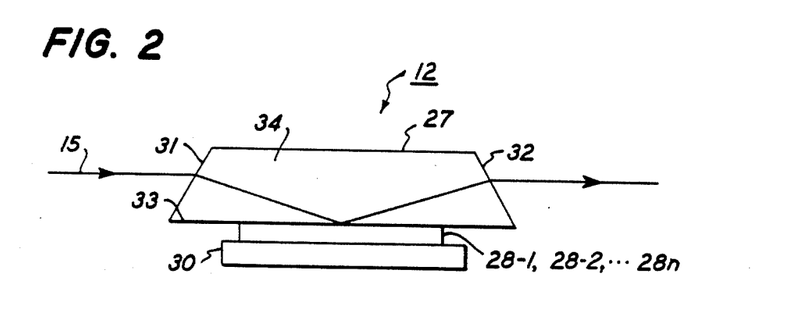
FIG. 2 is an enlarged side view of the modulator used with the scanner of FIG. 1 to achieve pulse imaging.
Figure 3:
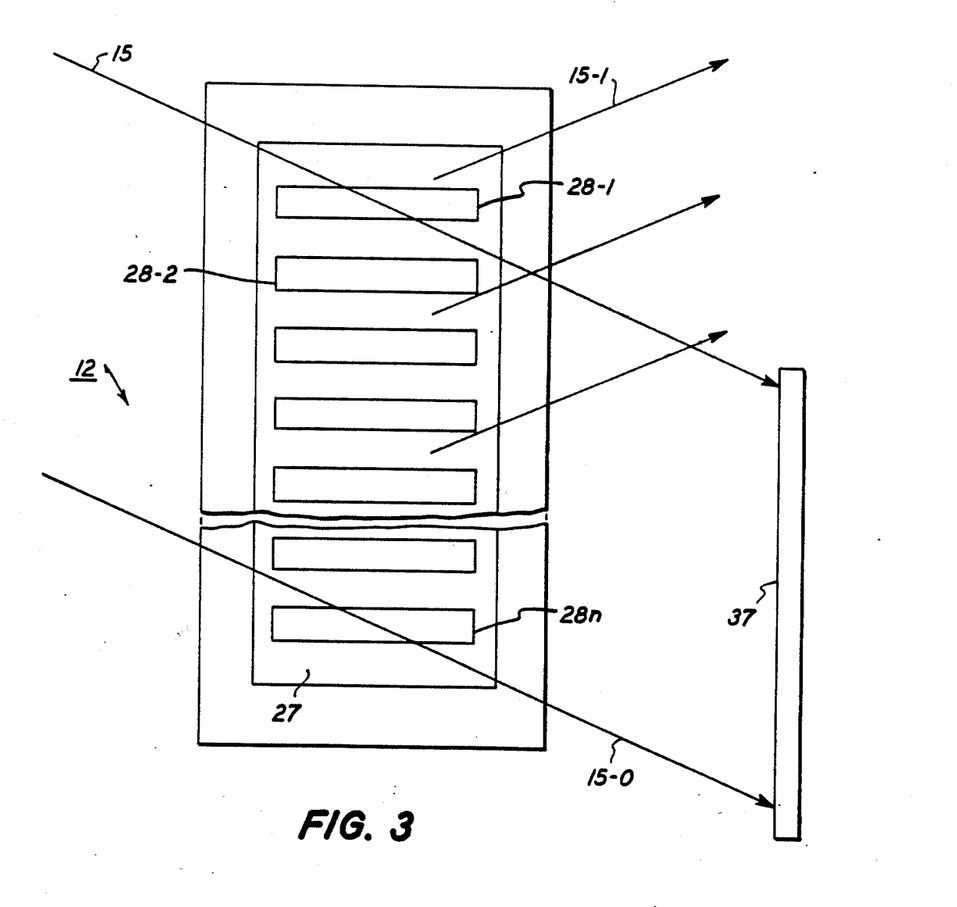
FIG. 3 is an enlarged top plan view of the modulator shown in FIG. 2.

Referring particularly to FIGS. 1–3 of the drawings, an exemplary raster scanner, designated generally by the numeral 10 and incorporating the pulse imaging system of the present invention is there shown. Scanner 10 comprises a Raster Output type Scanner or ROS wherein a beam 15 of high intensity radiation, i.e. light, modulated in accordance with image signals, is scanned across the photoconductive surface 14 of a recording member 13 to expose the recording member in an image configuration. The recording member 13 is moved (by means not shown) in the direction of arrow 11, referred to herein as the slow scan direction Y. It will be understood that recording members having various xerographic and non-xerographic recording surfaces may be used. For example, recording member 13 may comprise a drum, belt, or plate, or photosensitive film, or coated paper web or cut sheet, etc. As will be understood, recording member 13 is exposed while advancing in the slow scan direction Y relative to the scanning beam.

Figure 9:
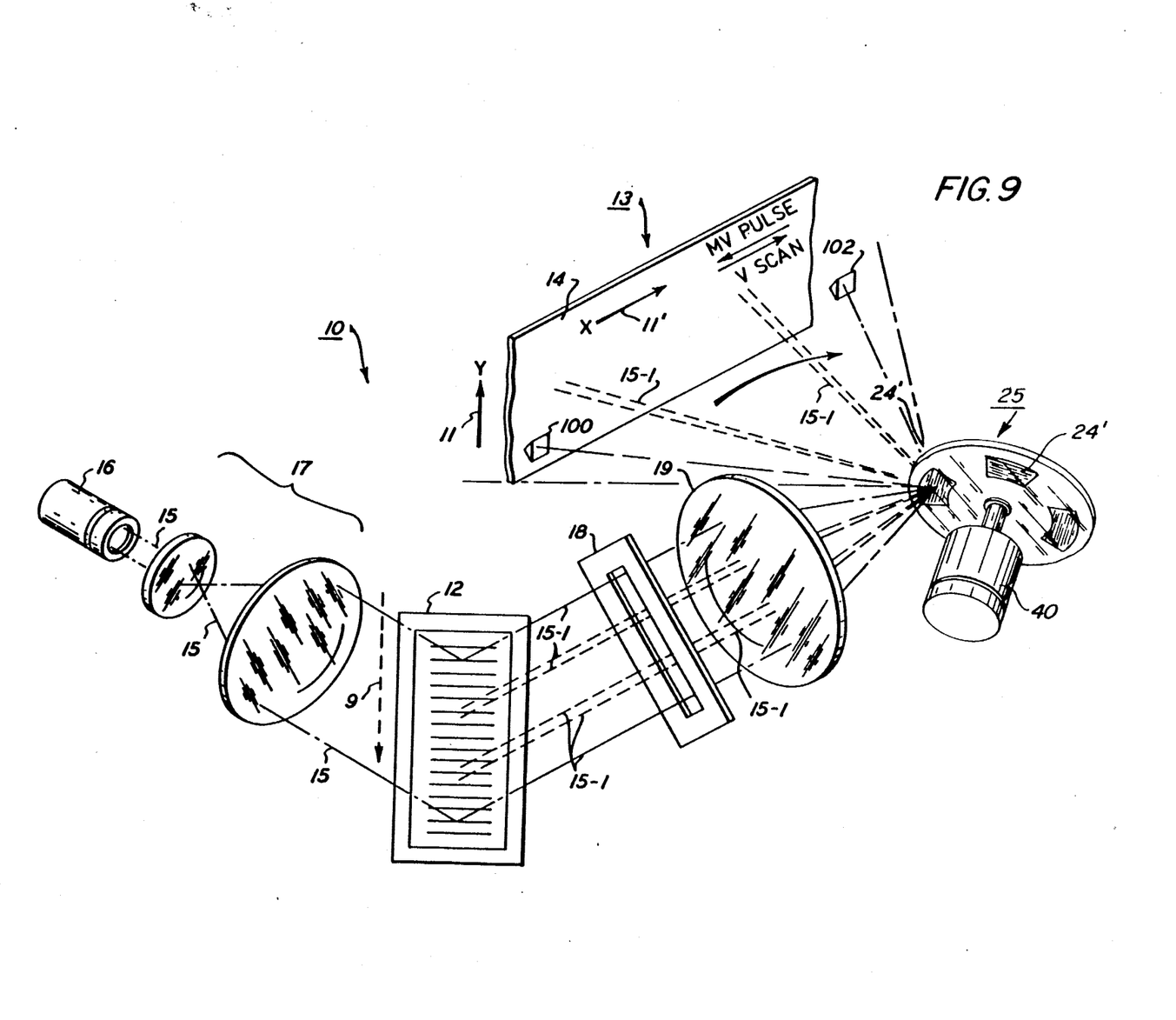
FIG. 9 is a schematic view of a raster output scanner incorporating the pulse imaging system of the present invention in which a holographic disk is used as the scanning element.

Scanning beam 15 is derived from a suitable flux source of electromagnetic radiation such as laser 16. The collimated beam 15 of monochromatic radiation generated by laser 16 is expanded by a suitable beam expander 17 and the resulting beam impinged on modulator 12 which modulates the beam 15 to provide zeroth order and first order beams 15-0 and 15-1 respectively in conformance with information contained in the image signal input as will appear. In the example shown, first order beam 15-1 serves as the exposure beam for exposing the photoconductive surface 14 of recording member 13. An imaging lens 19 focuses the writing beam pattern appearing at the output of modulator 12 via control aperture 18 and the mirrored facets 24 of a polygon type scanning element 25 onto the photoconductive surface 14. As will appear, the rotational movement of polygon 25 in effect sweeps the succession of exposure beams 15-1 output by modulator 12 across the photoconductive surface 14 to selectively expose, with each facet 24, an image line and create, in accordance with the content of the image signal input to modulator 12, a latent electrostatic image on the photoconductive surface. While a polygon type scanning element is shown and described herein, other scanning element types such as a holographic disk 25' shown in FIG. 9 may be envisioned. As will be understood by those skilled in the art, holographic disk 25' has a succession of diffraction gratings 24' adjacent the periphery thereof which diffract exposure beams 15-1 onto recording member 13.

As will be understood by those skilled in the art, the photoconductive surface 14 of the recording member 13 is uniformly charged by a suitable corotron for example preparatory to exposure by exposure beam 15-1. Following exposure by beam 15-1, the latent electrostatic image created on the photoconductive surface 14 of recording member 13 is developed, transferred to a suitable copy substrate material such as paper, and fused to provide a permanent copy. Following transfer, the photoconductive surface 14 is cleaned to remove any residual developer prior to charging.

Modulator 12 comprises a Total Internal Reflection (TIR) type modulator having an electro-optic base or element 27 with a series of individually addressable electrodes 28-1, 28-2, ... 28-n distributed in succession across the electro-optic element 27. In the exemplary arrangement shown and described herein, n represents 16 electrodes 28-1, 28-2, ... 28-16.

Electro-optic element 27 preferably comprises a y-cut crystal of Lithium Tantalate ($LiTaO_3$) for example having optically polished input and output faces 31, 32 at the ends thereof, and optically polished intermediate reflecting surface 33. Each electrode 28-1, 28-2, ... 28-n is engaged with, or at least closely adjacent to, the reflecting surface 33 to couple the electric fringe fields which are created into the electro-optic element 27. Typically, the electrodes 28-1, 28-2, ... 28-n are 9 um wide, equi-distantly spaced from one another by a distance of 9 um, and are 7 mm in length. A driver chip 30 for electrodes 28-1, 28-2, ... 28-n is provided, chip 30 applying suitable potentials +V, −V selectively across the electrodes 28-1, 28-2, ... 28-n in accordance with the image signal input as will appear.

As can be understood, the collimated beam 15 from laser 16 enters the electro-optic element 27 through input face 31 at a grazing angle of incidence relative to the reflecting surface 33. Beam 15 is brought to a wedge shaped focus (by means not shown) at approximately the longitudinal centerline of the reflecting surface 33 where it is totally internally reflected and exits from the electro-optic element 27 through the output face 32. While passing through the electro-optic element 27, the beam 15 is spatially phase front modulated in accordance with the image signal content.

Differences in potential between adjoining pairs of the electrodes 28-1, 28-2, ... 28-n create localized electric fringe fields which penetrate into an interactive region 34 of the electro-optic element 27 to produce a variation in the refractive index of the element 27 widthwise of interactive region 34. Consequently, as the beam 15 is passing through the interactive region 34, the phase front of the beam is sequentially spatially modulated in accordance with the image signal input at electrodes 28-1, 28-2, ... 28-n.

When operated in the Bragg diffraction regime, where the potential on adjoining pairs of the electrodes 28-1, 28-2, ... 28-n is the same, there is no phase alteration and the portion of beam 15 in the vicinity is undiffracted. In this case, the beam 15 emerges as a zeroth order beam. In the example shown, the zeroth order beam 15-0 is absorbed by a suitable beam stop 37 and may be said to be "off". Where a potential difference appears across adjoining pairs of the electrodes 28-1, 28-2, ... 28-n, i.e. as by the application of the potentials +V, −V to adjoining electrodes, a phase change occurs and the light is scattered into the first order beam which provides the exposure beam 15-1. In this case, the beam may be said to be "on". In the example discussed, when the image signal is low (i.e. "0"), exposure beam 15-1 is "on" while when the image signal is high (i.e. "1"), beam 15-1 is "off". As will be understood, the above relationship may be reversed with a high level image signal (i.e. a "1") resulting in the exposure beam 15-1 being "on" and a low level image signal (i.e. a "0") resulting in the beam 15-1 being "off".

While a Bragg diffraction regime is illustrated, electro-optic element 27 may be operated in the Raman Nath diffraction regime as will be understood by those skilled in the art. And while the first order beam 15-1 is used as the exposure beam, the zeroth order beam 15-0 may instead be used. In that circumstance, the first order beam 15-1 would be directed against beam stop 37.

Scanning polygon 25 which is preferably made from aluminum, is rotated by means of motor 40 in synchronism with movement of recording member 13. Polygon 25 is disposed so that the writing beam 15-1 is incident to the facets 24 thereof at a suitable angle (e.g. 30 degrees). The writing beam is reflected from facets 24 of polygon 25 at the same angle.

Figure 4:
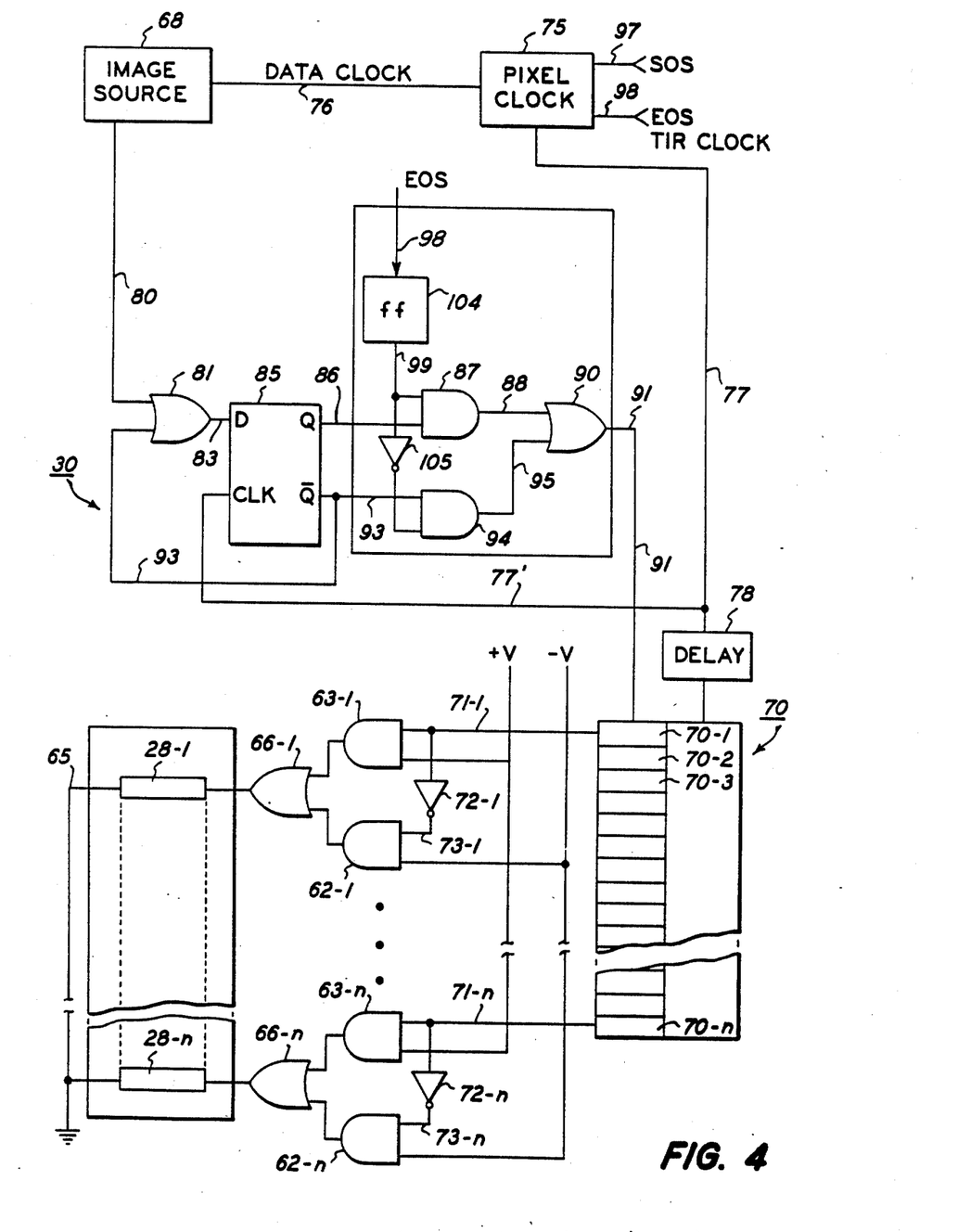
FIG. 4 is a circuit schematic illustrating the control system for the pulse imaging system of the present invention.
Figure 5:
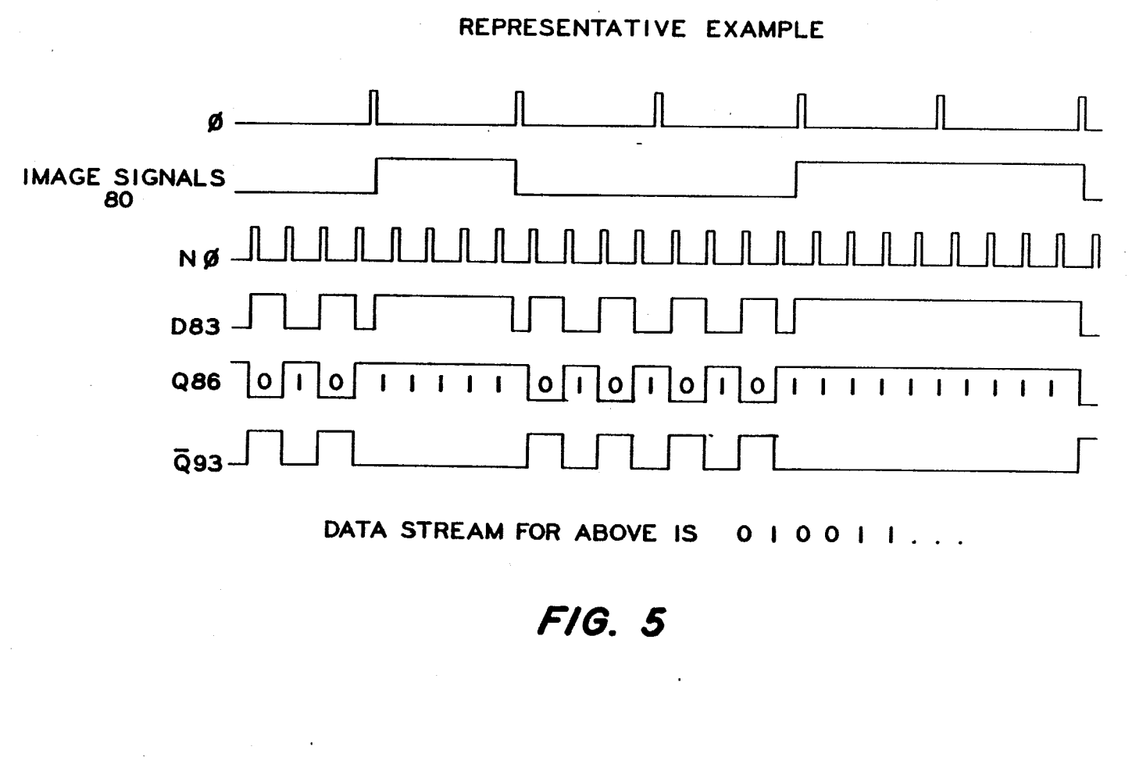
FIG. 5 is a timing chart illustrating the operating clock pulses for effecting pulse imaging.

Referring particularly to FIG. 4 of the drawings, driver chip 30 includes circuitry for operating electrodes 28-1, 28-2, ... 28-n individually and successively in synchronism with rotation of polygon 25 so as to write images on recording member 13 in accordance with the content of the image signal or pixel input. To operate electrodes 28-1, 28-2, ... 28-n, a suitable source of positive and negative potential +V, −V is provided. Potentials +V, −V may be of the order of 30–40 volts for example. Potentials +V, −V are coupled through lines 60, 61 respectively to one input of AND function gate pairs 62-1, 63-1; 62-2, 63-2; ... 62-n, 63-n, there being one AND gate pair for each electrode 28-1, 28-2, ... 28-n. The output terminals of gate pairs 62-1, 63-1; 62-2, 63-2, ... 62-n, 63-n are coupled through OR function gates 66-1, 66-2, ... 66-n to one side of electrodes 28-1, 28-2, ... 28-n respectively. The opposite side of electrodes 28-1, 28-2, ... 28-n are connected to a common potential such as ground by line 65.

A suitable source of image signals 68 is provided, it being understood that image signal source 68 may consist of memory, communication channel, raster input scanner, and the like. To control the application of either the +V or −V potential to the electrodes 28-1, 28-2, ... 28-n in accordance with the image signal output of image signal source 68, a clock driven serial to parallel converter 70 is provided, successive stages 70-1, 70-2, ... 70-n of converter 70 being coupled by lines 71-1, 71-2, ... 71-n to a second input of gates 63-1, 63-2, ... 63-n respectively. Lines 71-1, 71-2, ... 71-n are tapped by lines 73-1, 73-2, . . . 73-n, lines 73-1, 73-2, . . . 73-n being coupled through signal inverters 72-1, 72-2, . . . 72-n respectively to a second of gates 62-1, 62-2, . . . 62,n respectively.

To provide timing control and clocking for the image signals or pixels, a suitable pixel clock 75 is provided. Clock 75 provides a data clock signal $\phi$ to image signal source 68 through clock lead 76 and driving clock signals N$\phi$ through clock lead 77 and delay circuit 78 to the clock input of converter 70. N comprises a factor by which the clock signals $\phi$ are multiplied to provide the desired pixel width as will appear. Delay circuit 78 serves to assure that the clock signals N$\phi$ are synchronized with the image signal input to converter 70.

The output of image signal source 68 is passed through line 80 to OR function gate 81 and from gate 81 through line 83 to the D input of a flip flop 85. The Q output of flip flop 85 is coupled by line 86 to one input of an AND function gate 87. Line 88 couples the output of gate 87 to one input of OR function gate 90. Line 91 couples the output of gate 90 to the data input terminal of converter 70. The $\overline{Q}$ output of flip flop 85 is coupled by line 93 to a second input of gate 81 and to one input of an AND function gate 94. The output of gate 94 is coupled by line 95 to a second input of gate 90. Clock signals N$\phi$ from pixel clock 75 are input to the clock input of flip flop 85 through clock lead 77'.

The set/reset inputs to pixel clock 75 are coupled by lines 97, 98 to suitable Start Of Scan (SOS) and End Of Scan (EOS) detectors 100, 102 respectively. As shown in FIG. 1, SOS and EOS detectors 100, 102 are disposed in the path of writing beam 15-1 to identify the point at which the image line begins (SOS) and the point at which the image line ends (EOS). EOS line 98 is tapped by line 99, line 99 being coupled through flip flop 104 to a second input of gate 87 and through signal inverter 105 to a second input of gate 94.

Figure 6:
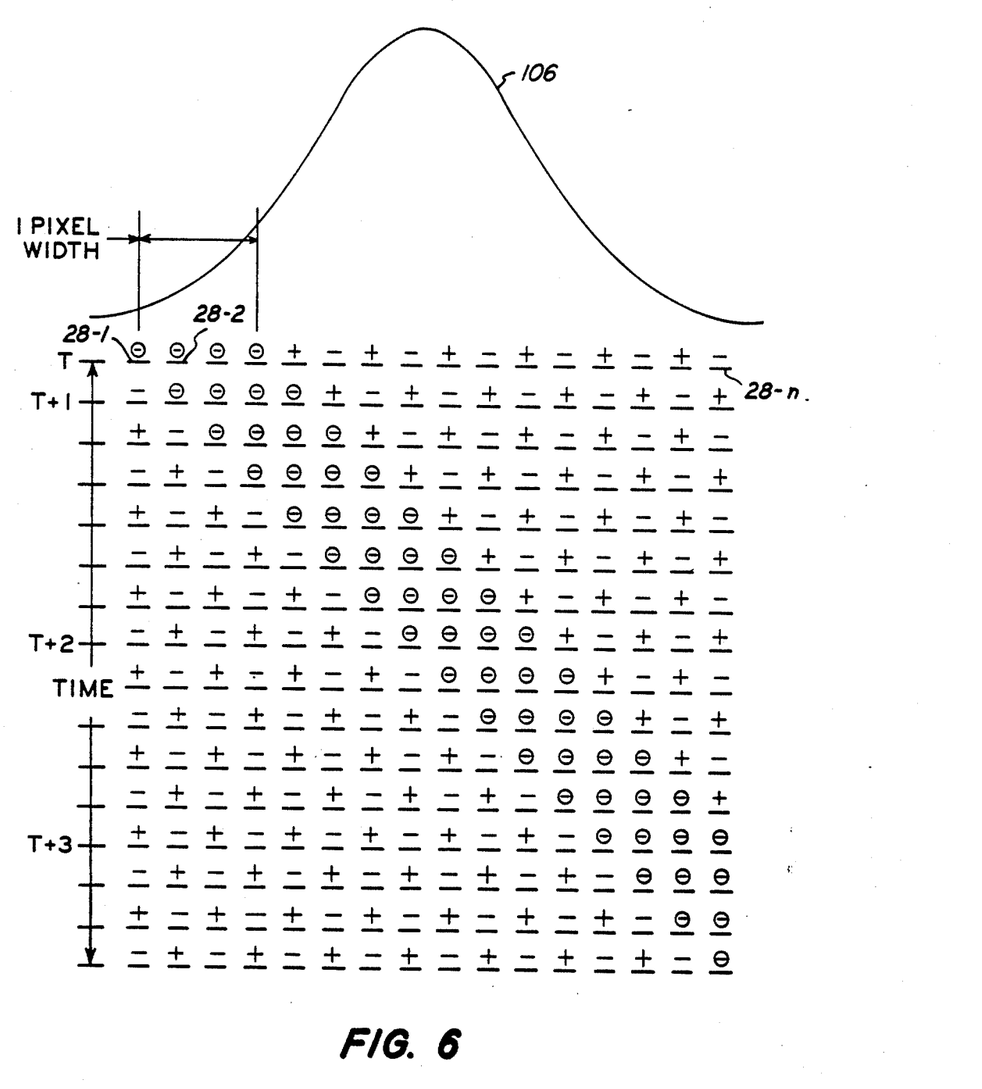
FIG. 6 is a view depicting the operating sequence of the modulator electrodes over a time interval during which one pixel is exposed.

Referring to FIGS. 6 through 8, a pixel width equal to 4 electrodes is shown as an example. In that circumstance, the factor N is equal to 4. Accordingly, the electrodes 28-1, 28-2, . . . 28-n in the array are actuated one by one in succession in blocks of 4, i.e. electrodes 28-1, 28-2, 28-3, 28-4; electrodes 28-2, 28-3, 28-4, 28-5; electrodes 28-3, 28-4, 28-5, 28-6, etc. To permit this, the video information from image signal source 68 is input at 4 times (i.e. N$\phi$) the pixel clock rate $\phi$.

As seen in FIGS. 6-8, the successive actuation of electrodes 28-1, 28-2, . . . 28-n in blocks of 4 produces a zero order beam segment 15-0 which travels across the gaussian intensity profile of the beam 15 (designated by numeral 106) in a direction perpendicular to the axis of impingement of beam 15 on the electro optic element 27 of modulator 12. As described, zero order beam 15-0 is stopped by stop 37. The exposure beam segment 15-1 output by modulator 12 is scanned across the surface 14 of recording member 13 by polygon 25 in synchronization with but in a direction opposite to the direction of rotation of polygon 25 to form a discrete pixel on the photoconductive surface 14 of recording member 13 without blur.

Other values for N may be envisioned.

Modulator 12 is oriented with respect to the other elements of the system so that the row of electrodes 28-1, 28-2, . . . 28-n is in the proper direction with respect to the surface 14 of recording member 13. In the exemplary arrangement shown, the non-diffracting/diffracting fringe fields move in a direction anti-parallel (the direction shown by the dotted line arrow 9 in FIG. 1) to the direction in which the exposure beam 15-1 is scanned by polygon 25. Since the beam 15-1 is caused to scan recording member 13 at a preset velocity, in order to minimize image blur it is required that the successive blocks of electrodes 28-1, 28-2, . . . 28-n be pulsed in the opposite direction at a speed such that the pixel spot of the image formed on recording member 13 appears stationary or immobilized. In other words, $V_{scan} = -M \cdot V_{pulse}$, where $V_{scan}$ is the scanning velocity of beam 15-1 at the surface 14 of recording member 13, $V_{pulse}$ is the pulsing speed in modulator 12, and M is the magnification of the scanner type Schlieren optics.

Beam 15 has a sufficient width to encompass the array of electrodes 28-1, 28-2, . . . 28-n which in the example shown, comprises 16 electrodes. It will be understood that more or less electrodes could be provided and the width of beam 15 would be adjusted accordingly. The more the electrodes 28, the better the image resolution obtained.

OPERATION

Referring particularly to FIGS. 1–8, the machine components are pre-aligned to impinge the exposure beam 15-1 on the facets 24 of polygon 25 as the facets move therepast. With energization of laser 16, a beam of light 15 is focused across the operating width of modulator 12 and the array of electrodes 28-1, 28-2, . . . 28-n. Polygon drive motor 40 is actuated to rotate polygon 25 in the direction shown while recording member 13 is driven by suitable means (not shown) in the cross scan direction (i.e. the Y direction depicted by arrow 11 in FIG. 1), a direction substantially perpendicular to the fast scan direction (i.e. the X direction depicted by the arrow 11'). It is understood that recording member 13 is previously readied for imaging as by charging.

When between scan lines, image signal source 68 is programmed to output a continuous low level image signal. As a result, modulator 12 generates exposure beam 15-1 to erase any non-image areas of recording member 13 and at the same time provide a beam to which SOS and EOS detectors 100, 102 can respond.

More specifically, the low level signal output of gate 81 to flip flop 85 provides a low level signal ("0") at the Q output of flip flop 85 with corresponding high lvel signal ("1") at the $\overline{Q}$ output thereof. Assuming for the moment that the signal in line 99 is high ("1"), gate 87 is enabled while gate 94 is not. Since there is a low level signal ("0") at the Q output of flip flop 85, the output of gate 85 is low, and a low level signal is loaded through line 88, gate 90 and line 91 into the first state 70-1 of converter 70 on the next clock pulse N$\phi$. The high level signal from the $\overline{Q}$ output to line 93 and gate 81 resets flip flop 85. With resetting of flip flop 85, the signal at the Q output of flip flop 85 goes high ("1") while the signal at the $\overline{Q}$ output goes low ("0"). As a result, the signal output of gate 87 to line 91 goes high and, on the next clock pulse N$\phi$, a high level signal ("1") is loaded into the first stage 70-1 of converter 70 while the low level signal ("0") previously loaded into the first stage 70-1 is shifted to the next stage 70-2 of converter 70. The low level signal at the $\overline{Q}$ output of flip flop 85 resets flip flop 85 to return the circuit to the initial condition described. The foregoing process continues with alternate low and high signals being loaded into and shifted through successive stages 70-1, 70-2, . . . 70-n of converter 70 with each clock pulse N$\phi$.

Where for example the signals at any one time in the converter stages 70-1, 70-2, . . . 70-n are 1,0,1,0,1,0, . . .

, gates 63-1, 63-3, 63-5, . . . are activated to apply a −V potential to every other electrode 28-1, 28-3, 28-5, . . . while gates 62-2, 62-4, 62-6, . . . are activated to apply +V potential to the remaining electrodes 28-2, 28-4, 28-6, . . . . As a result of the alternate application of −V and +V potentials to electrodes 28-1, 28-2, . . . 28-n, successive fringe fields are created in the interactive region 34 of electro optic element 27 across the electrode array. The laser beam 15 is diffracted in total to produce exposure beam 15-1 extending across the width of the electrode array. The exposure beam 15-1, which impinges against the moving facet of polygon 25 opposite thereto (the particular facet is designated for convenience by the numeral 24') is reflected by the moving facet 24' toward recording member 13 and SOS, EOS detectors 100, 102.

It will be apparent that on each succeeding clock pulse Nφ, the image signals in stages 70-1, 70-2, . . . 70-n of converter 70 are reversed which in turn causes a reversal in the potentials +V, −V applied to the array of electrodes 28-1, 28-2, . . . 28-n.

On detection of the beam 15-1 by SOS detector 100, the signal from detector 100 resets pixel clock 75 to assure synchronization of the clock pulses φ and Nφ with the start of the image line. Normally, at the start of the scan line, the signal output of image signal source 68 at least temporarily remains low ("0"), reflecting the side edge margin of the image being printed. In this context, it is understood that normally margins exist on each side of the image as well as at the image top and bottom. These margins are non-image (i.e. background) areas and are represented by a low level image signal. For example, where the line currently being scanned represents an image top or bottom margin area, the image signal output from source 68 will be low across the entire scan line.

When the output of image signal source 68 goes high ("1"), indicating a dark image area, flip flop 85 is reset and a high level signal ("1") appears at the Q output while low level signal ("0") appears at the $\bar{Q}$ output. The high level input to gate 87 triggers gate 87 which outputs a high level signal through gate 90 to line 91. The high level signal in line 91 which is loaded into the first stage 70-1 of converter 70 on the next clock pulse Nφ, enables gate 63-1 to place a −V potential on the first electrode 28-1 of modulator 12.

Since N, which represents the pixel width and serves in effect to multiply the number of signals representing each discrete image signal output by image signal source 68, is presumed to be equal to 4, the next 3 signal pulses output in response to clock pulses Nφ will be high also. Thus, on the next succeeding clock pulse Nφ, the high level signal previously loaded into the converter first stage 70-1 is shifted to the next stage 70-2 of converter 70 while the new high level signal is loaded into the first stage 70-1 of converter 70. At this point, the high level signals in stages 70-1 and 70-2 of converter 70 now actuate gates 63-1 and 63-2 to place the −V potential on electrodes 28-1 and 28-2. Since a common potential now exists on adjoining electrodes 28-1 and 28-2, the portion of the beam 15 impinging on the electro optic element 27 of modulator 12 in the vicinity of electrodes 28-1 and 28-2 is undiffracted and exits the output face 32 thereof as zero order beam 15-0. As described, zero order beam 15-0 impinges against and is absorbed by stop 37.

The foregoing is repeated for the next two successive clock pulses Nφ. With high level signals ("1") now loaded into the first four stages 70-1, 70-2, 70-3, 70-4 of converter 70, gates 63-1, 63-2, 63-3, and 63-4 are energized with the result that a common −V potential appears on successive electrodes 28-1, 28-2, 28-3, 28-4. As a result, that portion of beam 15 which impinges on electro optic element 27 in the vicinity of electrodes 28-1, 28-2, 28-3, 28-4 is undiffracted and passes through the element 27 and impinges against stop 37. This is represented by time T in FIG. 6 and is illustrated by the zero beam segment 15-0 shown in FIGS. 7a and 8a.

Figure 7A:
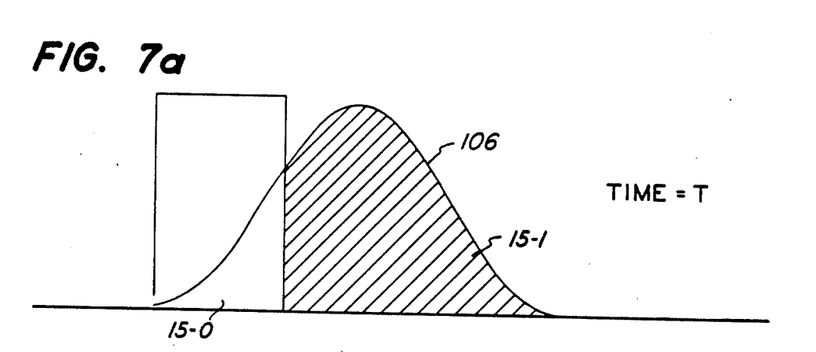
FIGS. 7a–7d are a series of views showiing the various writing beam segments superimposed on the Gaussian spread of the total beam intensity during a one pixel exposure.
Figure 7B:
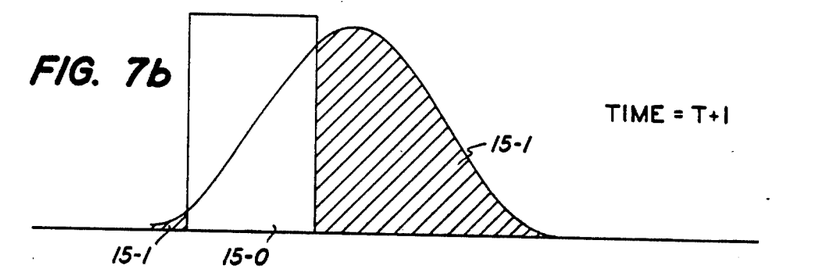
Figure 8A:
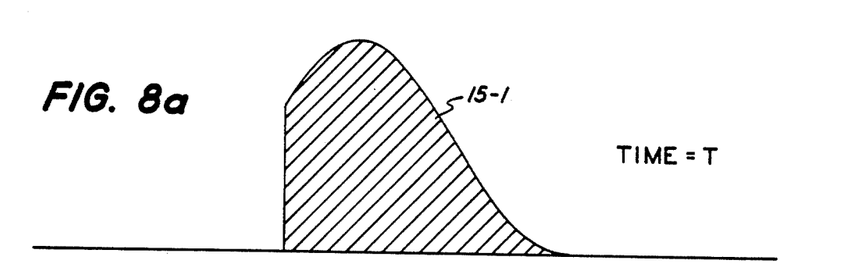
FIGS. 8a–8d are a series of views showing the relative intensity of the various writing beam segments at the recording member.
Figure 8B:
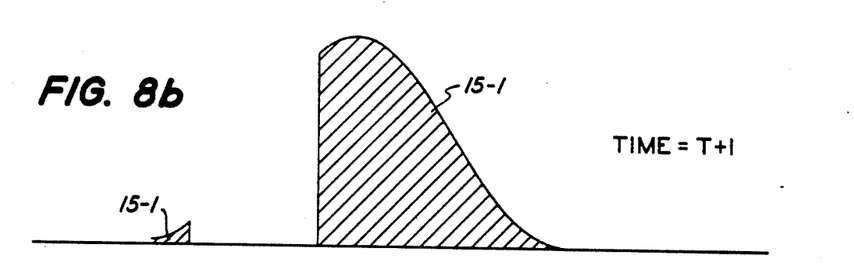

Assuming that the next image signal output by image signal source 68 is low, the change in output of image signal source 68 from high ("1") to low ("0") resets flip flop 85. As described, a low level signal ("0") appears at the Q terminal of flip flop 85 while a high level signal ("1") appears at the $\bar{Q}$ terminal. The low level signal is loaded into the first stage 70-1 of converter 70 on clock pulse Nφ while the block of low level signals formerly in stages 70-1 through 70-4 are shifted into stages 70-2 through 70-5. In this stage, the portion of beam 15 impinging on element 27 of modulator 12 in the vicinity of electrodes 28-2 through 28-5 is undiffracted and exits the output face 32 of element 27 to impinge against stop 37. The remainder of beam 15 impinging on element 27 in the vicinity of electrode 28-1 and electrodes 28-6 through 28-n is diffracted to provide the aforedescribed exposure beam 15-1. This is represented at time T+1 in FIG. 6 and is shown in FIGS. 7b and 8b by zero and first order beam segments 15-0 and 15-1 respectively.

Figure 7C:
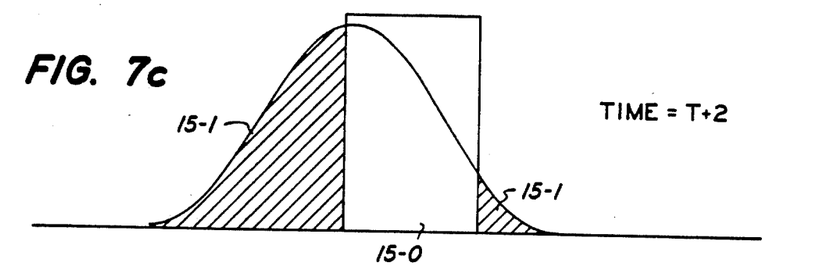
Figure 7D:
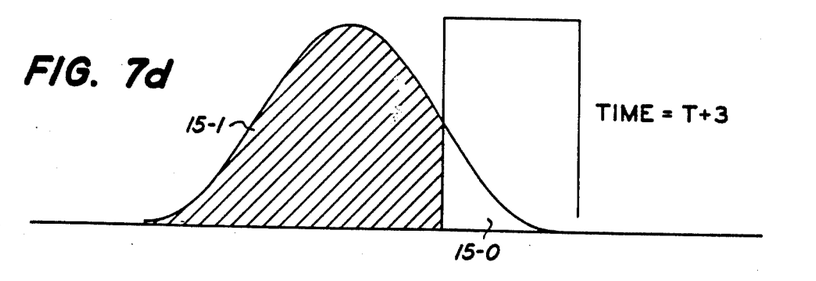
Figure 8C:
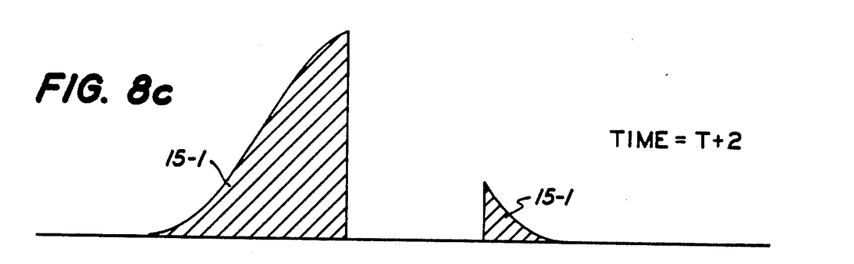
Figure 8D:
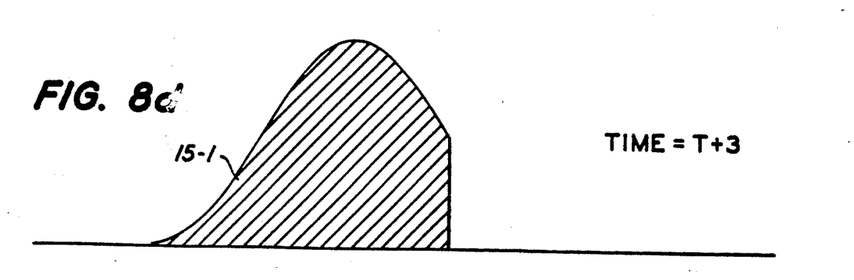

FIGS. 7c, 7d and 8c, 8d illustrate the continued movement of the varying intensity beam segments 15-0 and 15-1 in relation to one another at times T+2 and T+3. There, FIGS. 7c and 8c show the situation where the block of electrodes 28-8 through 28-11 have a common −V potential applied thereto and FIGS. 7d and 8d where the block of electrodes 28-13 through 28-16 have a common −V potential applied thereto.

While the foregoing description assumes a situation wherein the image signal output goes high for one pixel followed by the image signal for the next pixel being low, it will be understood that the image signal may be high for a series of consecutive pixels. In that situation, successive blocks of electrodes would have a common −V potential applied thereto and the width of the zero and first order beam segments 15-0 and 15-1 moving across the electo-optic element 27 of modulator 12 would correspond.

It is understood that the high/low image signal relationship described may be reversed as for example by placing a signal inverter in the output line 83 of gate 81.

Referring to FIG. 4 particularly, to avoid sustained application of a potential of the same polarity to the electrodes 28-1, 28-2, . . . 28-n, gates 87, 94 are toggled with each scan line. In the preceeding description, it was presumed that the signal in the output line 99 of flip flop 104 was high and accordingly gate 87 was enabled while gate 94 was not. On detection of the first order beam 15-1 by EOS sensor 102 at the end of scan, the signal from detector 102 resets flip flop 104. As a result, the signal in line 99 goes low, enabling gate 94 while disabling gate 87. This toggling of the gates 87, 94 switches the polarity of the potential applied to gates 28-1, 28-2, . . . 28-n in response to a high level image signal to a +V during the next scan line. Since as described, non-diffraction of beam 15 is dependent upon adjoining electrodes having a potential of the same polarity, modulator 12 operates in the same manner as described. At the end of the scan line, the signal from EOS sensor 102 resets flip flip 104 and the signal in line 99 becomes high, enabling gate 87 while disabling gate 94, and so forth and so on.

While the invention has been described with reference to the structure disclosed, it is not confined to the details set forth, but is intended to cover such modifications or changes as may come within the scope of the following claims.

We claim:

1. A high performance pulse imaging system, comprising in combination:
    (a) means providing a beam of high intensity radiation;
    (b) a recording member on which images are formed,
    (c) modulator means for modulating said beam in response to an image signal input to provide an imaging beam;
    (d) a movable scanning element for line scanning said imaging beam across said recording member to expose said recording member and form images thereon;
    said modulator means including:
        (1) a substrate, and
        (2) a row of discrete electrodes in operative relation with said substrate, said beam impinging on said row of electrodes, selective application of preset potentials to individual ones of said electrodes changing the index of refraction of said substrate in the vicinity of said electrodes and causing each segment of said beam passing through said substrate where the index of refraction is changed to be diffracted into at least one other path, each diffracted segment cooperating with any other diffracted segments to form a diffracted beam, remaining non-diffracted segments of said beam cooperating to form a non-diffracted beam;
        (3) one of said diffracted or non-diffracted beams comprising said imaging beam; and
    (e) control means for stepping said potentials across said row of electrodes from one end to the other so that said modulator outputs a succession of the segments of said beam progressing along said row of electrodes for each imaging spot, the segments of said beam progressing in a direction opposite to the direction of movement of said scanning element whereby to balance the rate at which successive ones of the segments of said beam are impinged on said recording member with the rate of movement of said scanning element to obviate image blur.

2. The system according to claim 1 in which said scanning element comprises a polygon.

3. The system according to claim 1 in which said scanning element comprises a holographic disk.

4. The system according to claim 1 in which said control means includes:
    (a) a control gate for actuating each of said electrodes to provide the segments of said beam;
    (b) means for applying image signals to said control gates to provide either said diffracted or non-diffracted beam in accordance with the image signal content; and
    (c) timing means for enabling said control gates in succession across said row of electrodes for each image of said image signal input.

5. The system according to claim 1 including a source of positive and negative potentials for said preset potentials, said control means including means to change said preset potentials from said positive potential to said negative potential, and vice versa on each scan line.

6. In a scanner for writing images on a recording member having a beam of high intensity radiation, a modulator for modulating said beam in response to image signals to provide a writing beam for writing images represented by said image signals on said recording member, said modulator including a substrate, and a row of electrodes in operative relation with said substrate in the path of said beam such that application of a preset potential differences to selective pairs of adjoining ones of said electrodes in said row of electrodes changes the index of refraction of said substrate in the vicinity of said electrode pairs to alter the path of the portion of said beam passing through said substrate in the vicinity of said electrode pairs and provide said writing beam, optical means for focusing said writing beam to an impaging spot on said recording member and a movable scanning element for scanning said writing beam and sweeping said imaging spot across said recording member, the improvement comprising:
    control means for actuating said electrodes in stepped fashion starting at one end of said row of electrodes and progressing electrode by electrode to the other end of said row of electrodes whereby a succession of the portions of said beam are output by said modulator for each imaging spot, said succession of the portions of said beam progressing across said modulator in a direction opposite to the direction of scanning motion of said scanning element whereby image blur is obviated.

7. The scanner according to claim 6 in which said scanning element comprises a polygon.

8. The system according to claim 6 in which said scanning element comprises a holographic disk.

* * * * *